UNITED STATES PATENT OFFICE.

GEORGE W. DUBUISSON, OF TOM'S RIVER, NEW JERSEY.

IMPROVEMENT IN BLEACHING JUTE FOR PAPER-PULP.

Specification forming part of Letters Patent No. 162,043, dated April 13, 1875; application filed September 29, 1874.

*To all whom it may concern:*

Be it known that I, GEO. W. DUBUISSON, of Tom's River, Ocean county, in the State of New Jersey, have invented an Improved Method of Treating Jute, Gunny, and Manila for the Manufacture of White Paper, and for other purposes, of which the following is a specification:

My invention relates to a new process in which potash is used as a necessary alkaline agent for the treatment of jute, gunny, and manila, and similar plants, whereby their fibers are disintegrated, freed from their natural coloring matter, and converted into pulp or fine filaments for the manufacture of fine white paper, and for other purposes.

The plants above named hold so tenaciously their color and the hardening constituents which, in their natural state, they contain, that the removal of these elements, by the methods and agents hitherto employed, has been found to be either impossible or practically so difficult, and attended with so much expense and waste of the raw material, that the use of these plants has hitherto been limited to the manufacture of the coarser grades of paper, in which some color is permitted. By my new process these plants may be freed from their natural coloring matter and converted into a white, soft, silky filament, from which the finer grades of white paper may be made with small waste of the raw material and at an expense that will enable the manufacturer to realize a fair profit on the paper made from them.

My method of treating these plants, whereby I deprive them of their natural coloring matter, and convert their fibers, freed from the gums and hardening elements by which in their natural state they are invested, into soft white fine filaments suitable for the manufacture of paper of the finest and whitest quality, and for other purposes, is as follows: The plants for paper stock are, for convenience, cut into pieces an inch to an inch and a half in length. The dust and dirt are then thoroughly removed, which may be conveniently done in what is known among paper-makers as the "duster," a revolving cylinder made of wire-cloth. They are then ready for the disintegrating process, by which the natural gums and hardening elements of the plant are dissolved out, thus exposing the natural coloring matter to the action of the bleaching agent. This process consists in subjecting the plants to the action of common potash-salts, formed by evaporating the ley obtained by leaching wood-ashes. To this end the plants are put into a suitable vessel, and with them about eight pounds of potash to each one hundred pounds of the plants, water being added sufficient to form a liquor that will test about two per cent. of potash by the hydrometer. The temperature is then raised (and, preferably, gradually and slowly) to boiling, and then the boiling continued from eight to twelve hours. The more complete and efficient mode of conducting the boiling is in a steam-tight boiler by the use of steam, and under forty to sixty pounds steam-pressure. If a larger per cent. of potash than that above indicated is used, the fiber of the plant is liable to be injured. If a less per cent. is used, the boiling will have to be prolonged; and it will be found that the complete disintegration of the fiber and the removal of the natural coloring matter will not be satisfactorily accomplished if liquor of less strength than one per cent., tested by the hydrometer, is employed. After this operation of boiling in a solution of potash is completed the mass of fiber is removed from the solution, and the solution carefully preserved, to be restored and again used, as hereinafter described. The mass is then subjected to a thorough washing in water for the purpose of removing all traces of the potash. This is usually done in the washing-engine, in which, after the washing is completed, the mass of fiber is reduced to "half-stock," so called. The mass is then ready for the bleaching-liquor, consisting usually of the chloride of lime dissolved in water. About ten pounds of the lime should be used for each hundred pounds of the fiber, and the liquor made with it should test about one and a half per cent. by the hydrometer. After the bleaching-liquor is added the mass is allowed to remain at rest until the bleaching operation is completed and the natural color of the plant destroyed, which will usually occupy about forty-eight hours, the time, however, depending somewhat upon the depth and consequent compactness of the mass as it stands in the bleaching-tubs, the more compact the mass the longer the time required for the bleaching-agent to permeate it. The stock is then removed from the bleaching-liquor and transferred to the beating-engine, where the lime is thoroughly washed out, an operation which usually occupies about an hour for, say, a hundred-pound batch of stock. The time may be shortened and the removal of all traces of the lime facilitated by adding a small quantity—say, a couple of ounces—of the hyposulphite of soda, which acts to neutralize the lime.

After the washing is completed, the beating is continued until the stock is reduced to a pulp or fine filaments. It will be found to readily yield to the action of the beater, whereby the fibers are divided into fine white silky filaments, in which the natural coloring matter of the plant will have been very completely destroyed, the potash having acted to dissolve out the natural gluten and hardening matter of the plant, so that they are washed away, leaving the coloring matter exposed to be attacked and destroyed by the chlorine. This result will be accomplished by potash without injuring the true fiber of the plant, the total loss upon the plants in their natural state being not more than thirty to forty per cent., including all the impurities and extraneous matter connected with them as they are imported into our markets.

It will be observed that I have especially designated potash as the alkaline agent to be employed in my process. The employment of this particular alkali is essential to my process. Soda has been hitherto generally and, so far as I know, exclusively used in the attempts that have been made to disintegrate and bleach the plants named. But the effect above described, as produced by potash, cannot be produced by the soda-ash in common use or any other form of soda, and soda is not the equivalent of potash in this process. I therefore limit myself in this specification to the use of potash.

The potash solution, preserved as above indicated, is restored and again used as follows: It is filtered through leached wood-ashes, whereby the coloring matter and the gummy or glutinous juices and earthy matter it has extracted from the plants treated in it are filtered out and the solution is restored clear and fit for further use, with a loss of only about twenty or twenty-five per cent. of its potash.

Then, for operation upon another batch, I add potash to supply the said loss, together with more water, if needed; and so, by repeated filterings and the restoration of the solution after each boiling, I expend of potash only the small percentage above indicated.

The leached ashes employed for filtering the potash solution may be used until well filled with the impurities retained from the solution, when they will be found to have been doubled or trebled in value as a fertilizer. From this source the manufacturer may be reimbursed not only the outlay for the leached ashes, but also a considerable portion of the cost of the potash which disappears in the treatment of the stock.

I am aware that I am not the first to employ potash as an alkaline agent in the treatment of paper stock. At an early day in the history of paper-making it was often used. But since the comparatively cheaper article of soda has been introduced that has entirely superseded potash, and for many years has been exclusively employed. It is since soda thus superseded potash that the first experiments in the use of jute, gunny, and manila for paper were made, and, therefore, never, in any instance, so far as I know, has potash been employed in the treatment of these substances. It is a fact, which does not seem to have been hitherto discovered and known, that potash produces an effect in the treatment of natural unwrought vegetable growths quite different from that produced by soda. The two alkalies are not in this process in all respects equivalents, having reference to the action of each upon the vegetable fiber, as hereinbefore specified.

It may not be absolutely impossible, by the use of soda-ash as the alkaline agent, to so disintegrate fibers of these plants as to prepare them for fine paper-making, and to so dissolve their gums and juices as to enable the bleaching agent to destroy their natural color, but such results can be produced with soda, if at all, only by using such an amount of the alkali, and submitting the plants to its action for such a length of time, as to destroy a large part of the fibers operated upon and render the operation too costly for profit. There would seem to be between potash and the natural juices and gums of these plants a greater affinity. At all events, these elements so much more readily yield to the solvent action of this alkali than to soda, that while the manufacture of white paper from these plants by the use of soda is practically infeasible, by the use of potash under my process it is practicable and profitable.

My process, above described, is an improvement upon that hitherto practiced in the treatment of jute, gunny, and manila in two important respects: First, it produces a paper stock whiter and of a better quality than has heretofore been made from these substances; and, second, such stock is produced at a less cost than an inferior stock is now produced from these substances by any method practiced.

So great is the difference in the action of the two alkalies, potash and soda, upon vegetable fiber that I am confident the white-paper stock which I have produced by the use of potash from the plants above named is, in fact, a new manufacture. But I do not here intend to claim it as such, reserving it for a separate application for a patent therefor, which it is my purpose to make.

What I claim as my invention, and desire to secure by Letters Patent, is—

1. The method or process herein described of disintegrating the fibers of jute, gunny, and manila, and preparing them for bleaching by the use of potash, substantially as specified.

2. The method herein described of repeatedly using the potash solution in the treatment of jute, gunny, and manila after such solution is restored by leaching through leached ashes, substantially as specified.

GEO. W. DUBUISSON.

Witnesses:
J. P. FITCH,
W. C. ABBE.